(12) United States Patent
Puckett et al.

(10) Patent No.: US 8,662,015 B2
(45) Date of Patent: Mar. 4, 2014

(54) BIRD FEEDER

(75) Inventors: Betsy P. Puckett, Foster, RI (US); Marco Wo, Providence, RI (US)

(73) Assignee: Droll Yankees, Inc., Foster, RI (US)

(*) Notice: Subject to any disclaimer, the term of this patent is extended or adjusted under 35 U.S.C. 154(b) by 0 days.

(21) Appl. No.: 13/177,581

(22) Filed: Jul. 7, 2011

(65) Prior Publication Data

US 2011/0308471 A1 Dec. 22, 2011

Related U.S. Application Data

(60) Continuation-in-part of application No. 12/639,111, filed on Dec. 16, 2009, now abandoned, and a division of application No. 11/893,067, filed on Aug. 14, 2007, now Pat. No. 7,634,974.

(60) Provisional application No. 60/837,753, filed on Aug. 15, 2006.

(51) Int. Cl.
*A01K 39/00* (2006.01)

(52) U.S. Cl.
USPC .......................................... 119/51.01; 119/72

(58) Field of Classification Search
USPC .......... 119/51.01, 51.5, 72, 74, 57.8; 222/164
See application file for complete search history.

(56) References Cited

U.S. PATENT DOCUMENTS

| | | | |
|---|---|---|---|
| 38,277 A | 4/1863 | Bassett | |
| 126,180 A | 4/1872 | Burgess | |
| 153,106 A | 7/1874 | Osborn et al. | |
| 1,537,615 A | 5/1925 | McConnell | |
| 1,772,729 A | 8/1930 | Pisani | |
| 1,808,784 A | 6/1931 | Ocasek | |
| 1,886,015 A | 11/1932 | Henning et al. | |
| 2,056,827 A * | 10/1936 | Clawson | 220/757 |
| 2,176,711 A * | 10/1939 | Gorman, Jr | 220/776 |
| 2,475,207 A | 7/1949 | Smith | |
| 2,619,313 A | 11/1952 | Whittington | |
| 2,652,054 A * | 9/1953 | Bishop | 215/399 |
| 3,071,282 A | 1/1963 | Walters | |
| 3,125,069 A | 3/1964 | Fowler | |
| 3,299,442 A | 1/1967 | White et al. | |
| 3,813,004 A * | 5/1974 | Andreaggi | 220/756 |
| 4,004,710 A * | 1/1977 | Crisci | 220/780 |
| 4,095,830 A | 6/1978 | Spellman | |
| 4,119,248 A | 10/1978 | Butler et al. | |
| 4,301,935 A | 11/1981 | Gokcen et al. | |
| 4,537,044 A * | 8/1985 | Putnam | 62/371 |
| 4,545,501 A | 10/1985 | DeFord | |
| D294,325 S * | 2/1988 | Fiore, Jr. | D7/320 |
| 4,738,221 A | 4/1988 | Nock | |
| 4,976,369 A * | 12/1990 | Shindo et al. | 220/270 |
| 5,295,365 A * | 3/1994 | Redford | 62/265 |
| 5,461,822 A | 10/1995 | Green et al. | |
| 6,115,883 A * | 9/2000 | Um | 16/405 |
| 6,269,949 B1 * | 8/2001 | Gottlieb | 206/519 |
| 6,484,667 B2 | 11/2002 | Pelletier | |

(Continued)

FOREIGN PATENT DOCUMENTS

GB 2 246 745 12/1992

*Primary Examiner* — Kimberly Berona
(74) *Attorney, Agent, or Firm* — Salter & Michaelson

(57) ABSTRACT

A miniature size bird feeder that includes a feed holder; a cap or cover over the feed holder; means for releasably attaching the cap or cover to the feed holder and an attachment means for supporting the feed holder.

20 Claims, 17 Drawing Sheets

(56) References Cited

U.S. PATENT DOCUMENTS

| | | |
|---|---|---|
| 6,783,033 B1 | 8/2004 | Chan |
| 7,740,216 B1 | 6/2010 | Puckett et al. |
| 2001/0027980 A1* | 10/2001 | Perkins et al. ............... 220/764 |
| 2007/0295335 A1 | 12/2007 | Nashed |
| 2008/0282989 A1 | 11/2008 | Nylen |
| 2010/0089328 A1 | 4/2010 | Puckett et al. |
| 2011/0073609 A1* | 3/2011 | Lesquir ............... 220/763 |

* cited by examiner

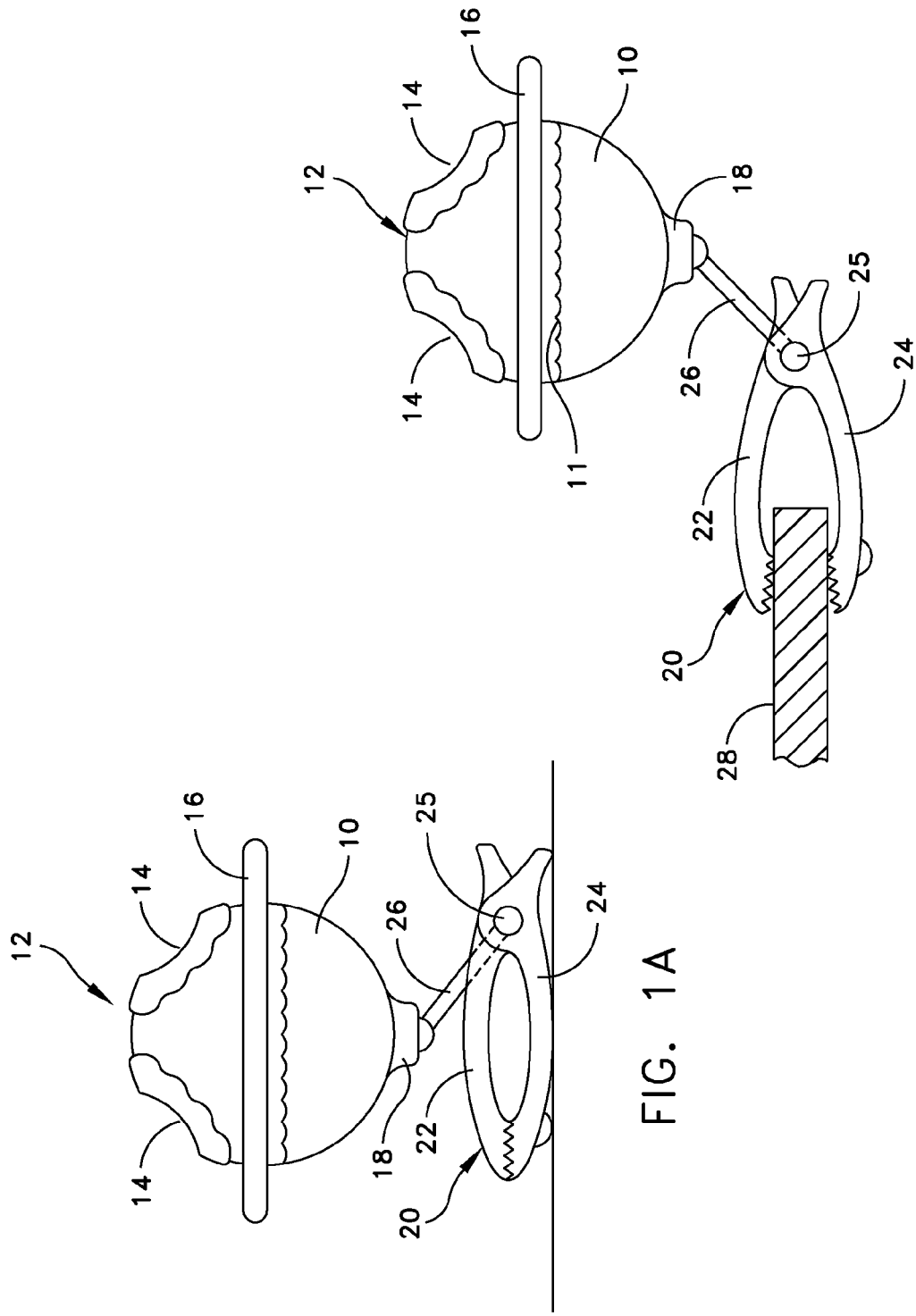

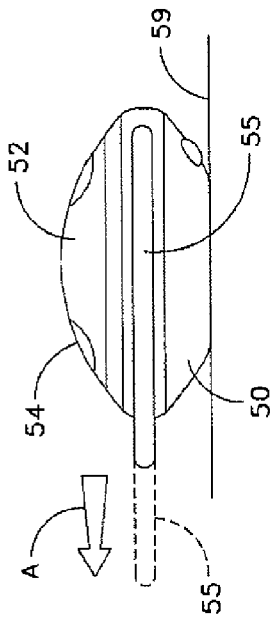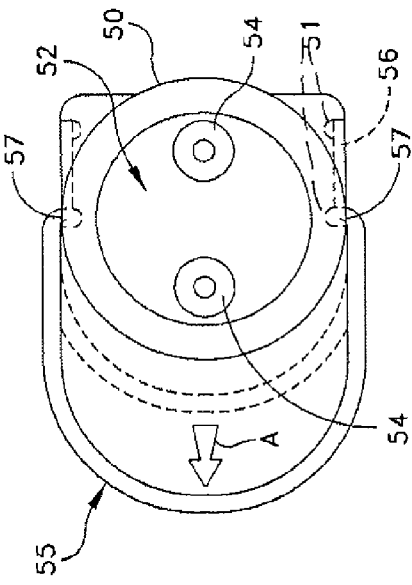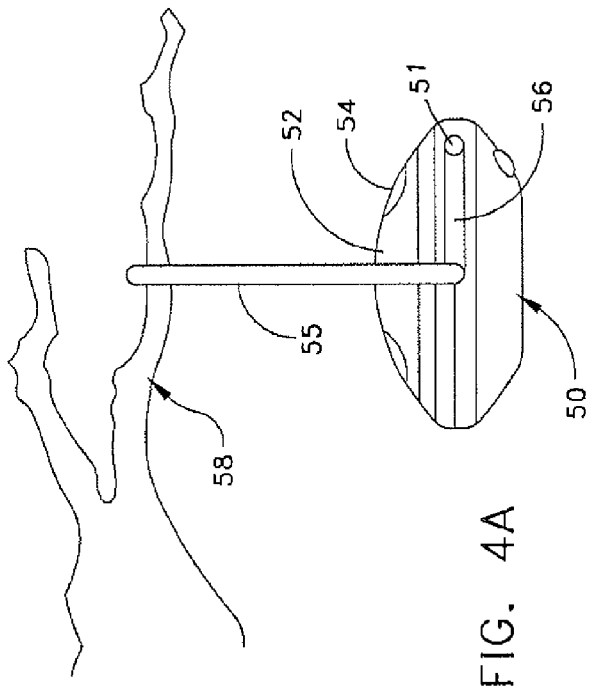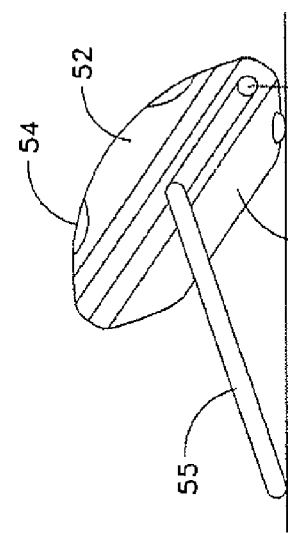

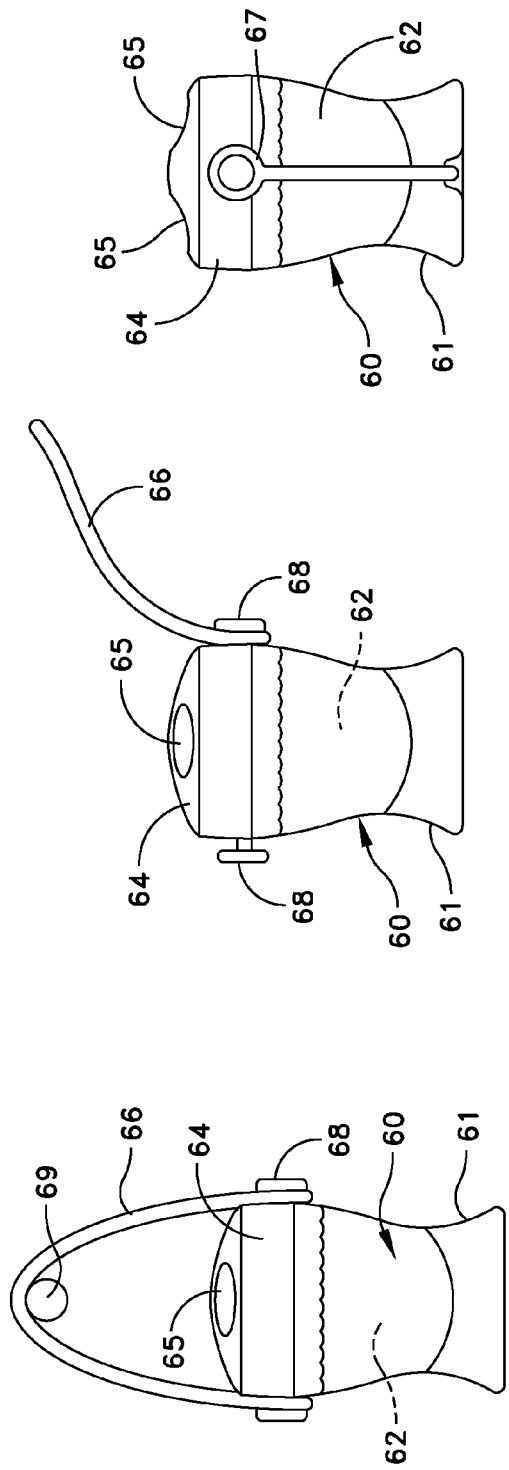
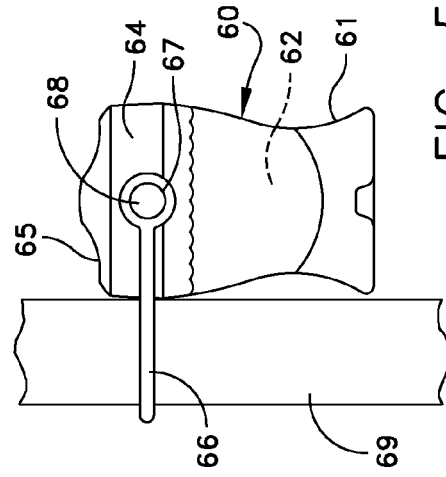
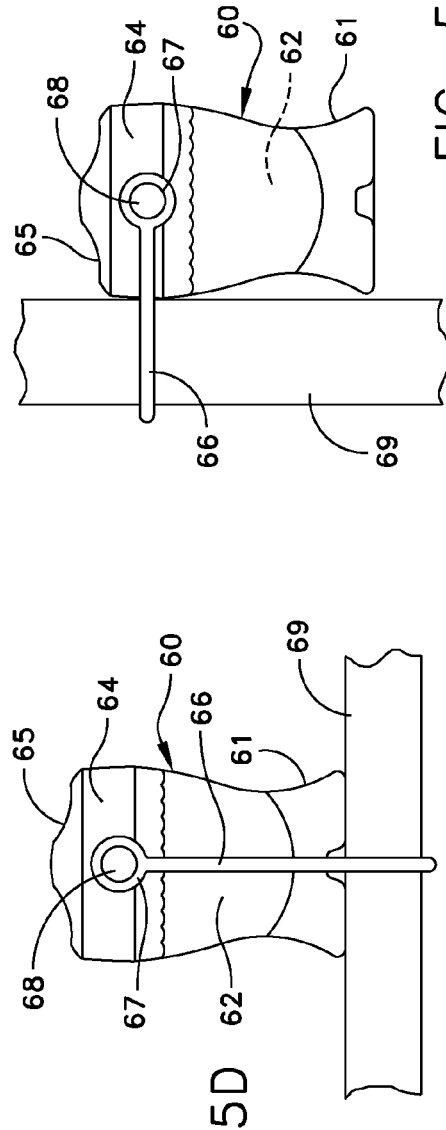

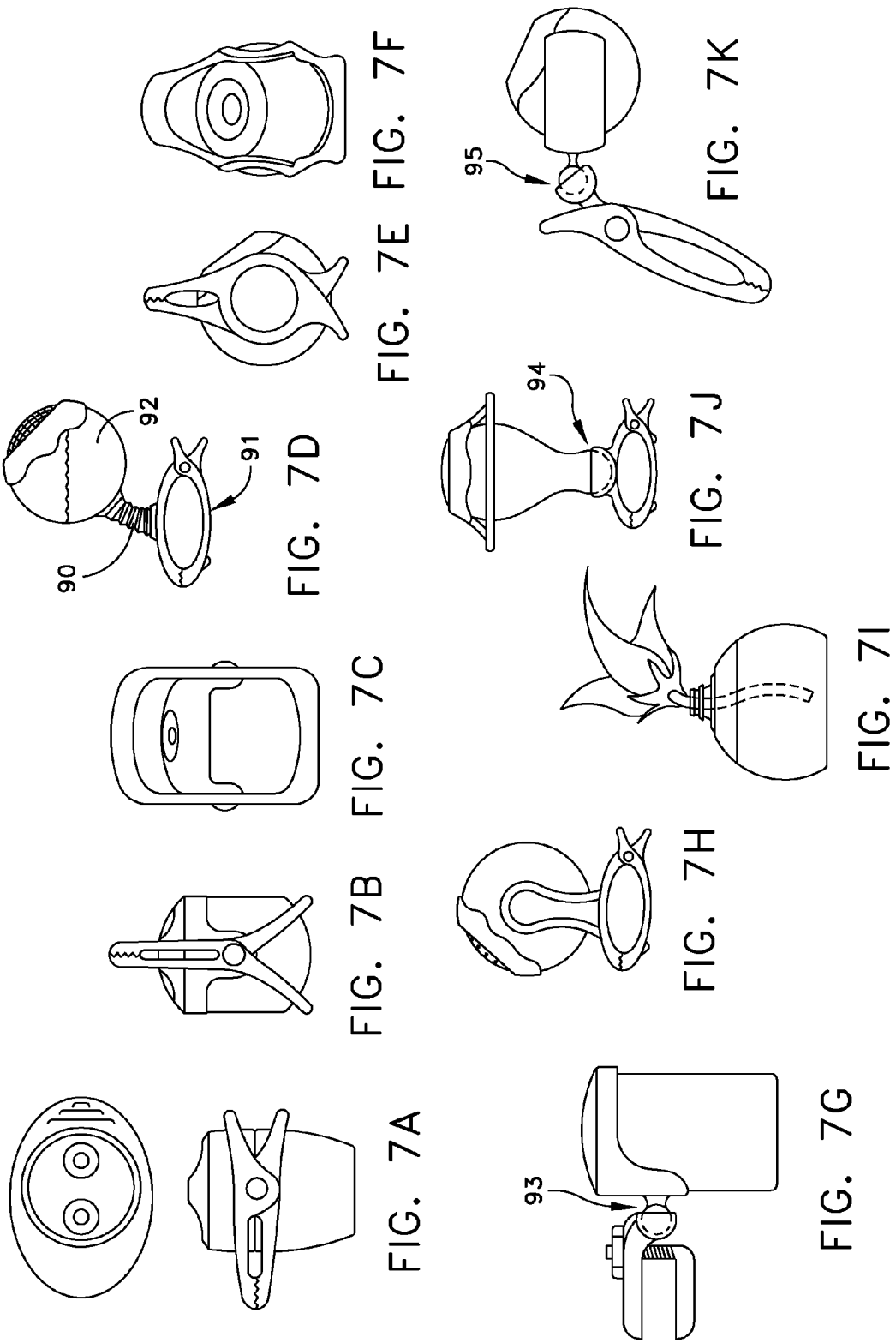

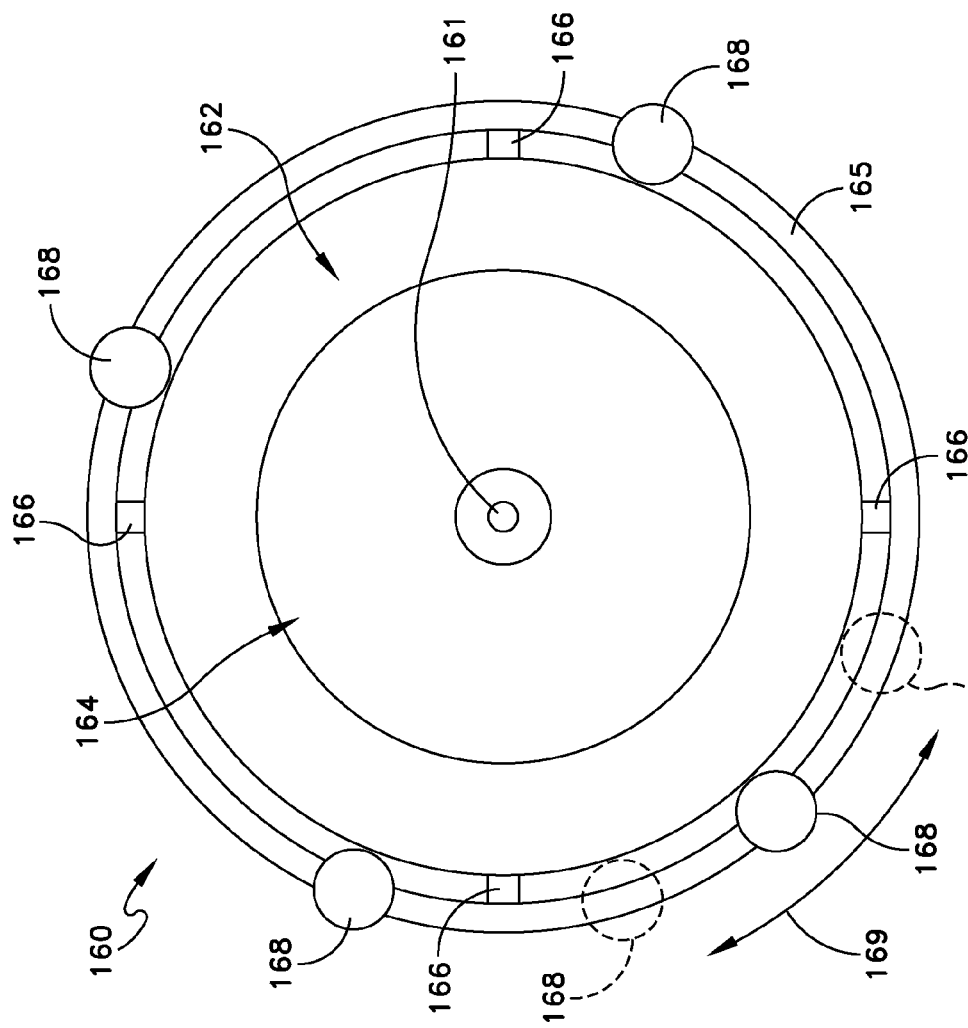

BIRD FEEDER

RELATED APPLICATIONS

This application is a continuation-in-part of U.S. Ser. No. 12/639,111 filed on Dec. 16, 2009 which is a divisional of U.S. Ser. No. 11/893,067 filed on Aug. 14, 2007 and for which priority for this application is hereby claimed under 35 U.S.C. §119(e) to commonly owned U.S. Provisional Patent Application No. 60/837,753 which was filed on Aug. 15, 2006 and said applications are incorporated by reference herein in their entirety.

TECHNICAL FIELD

The present invention relates generally to bird feeders and pertains, more particularly, to bird feeders used particularly for feeding hummingbirds.

BACKGROUND OF THE INVENTION

There are numerous types of bird feeders that are available. However, most of these bird feeders are adapted for use with average-size birds. Existing bird feeders are relatively large and are appropriate for only certain placements.

Wild bird feeders are typically placed in somewhat permanent positions around a person's house and in their yard or garden. They can be hung from trees or poles, mounted on windows or window sills, screwed to trees or buildings and other such semi permanent positions where they can be observed for the enjoyment of bird watching. During warmer weather, when people spend more time in their yards, they may not always be able to view their bird feeders from all areas. Additionally, it is desirable to many people to attract wild birds closer to them where they can enjoy them in detail, their intricate forms, colors and wild behavior. While most wild birds tend to be skittish by nature and fly away when humans are around, some species are more apt to feed near humans.

Accordingly, it is an object of this invention to provide a bird feeder that can be transported easily and can be readily attached to a wide variety of objects in the yard.

Still another object of the present invention is to provide a bird feeder that is relatively small in size and that is particularly adapted for feeding hummingbirds or other similar small birds.

Another object of the present invention is to provide a small bird feeder that is relatively simple in construction and that preferably has a holder and a readily releasable top with one or more apertures for providing access of the hummingbird to the feed holder.

Still another object of the present invention is to provide a bird feeder preferably for hummingbirds and that has a versatile attachment means that enables the feeder to be supported from any number of different objects or on its own.

SUMMARY OF THE INVENTION

To accomplish the foregoing and other objects, features and advantages of the present invention, there is provided a versatile bird feeder that is relatively small in size and that is particularly adapted for the feeding of hummingbirds or the like small birds. The various embodiments of the invention that are described herein all are characterized by a versatility of attachment. This attachment provides a simple way of supporting the feeder from any number of different objects. The feeder bowl is basically a food holder, and in the preferred embodiment, a screw top is used having one or more apertures through which the bird may access the feed within the holder. The preferred form of attachment of the feeder is a flexi-tube system. A side stem may also be provided as an additional feature positioned as a perch.

In accordance with the invention there is provided a miniature size bird feeder that includes a feed holder; a cap or cover over the feed holder; means for releasably attaching the cap or cover to the feed holder and an attachment means for supporting the feed holder. The attachment means may comprise any one or more of a pivot clamp; a plurality of support legs; a clamp hanger; a handle; an elastic band; a flexible line that is adapted to be bent into various configurations. The cover or cap is preferably engaged with the holder by being screwed thereon, but could also be attached by other means such as a snap fit. The feed holder preferably has at least one feed port sized for access by a small bird, typically a hummingbird.

In accordance with the invention there is provided a miniature size bird feeder that includes a feed holder; a cap or cover over the feed holder; means for releasably attaching the cap or cover to the feed holder and an attachment means for supporting the feed holder. The attachment means may comprise one or more of a pivot clamp; a plurality of support legs; a clamp hanger; a handle; an elastic band; a flexible line that is adapted to be bent into various configurations. The cover or cap may be engaged with said holder by being screwed thereon.

In accordance with another aspect of the present invention there is provided a miniature size bird feeder that includes a feed holder having a feed port sized for access by a small bird and an attachment means for supporting the feed holder. The attachment means preferably comprises a flexible line that is adapted to be bent into various configurations for support of the holder.

In accordance with still another aspect of the present invention there is provided a miniature size bird feeder that includes a feed holder, a cap or cover over the feed holder, said cap or cover being provided with at least one feed port, said cap or cover being releasably attached to an opening in the feed holder, and an attachment member for supporting the feed holder either in a self-supporting manner or from another object. The attachment member may comprise one or more of a pivot clamp; a plurality of support legs; a clamp hanger; a handle; an elastic band; a flexible line that is adapted to be bent into various configurations; a plurality of flexible stem members that are each able to be formed into a predetermined configuration and maintained in that configuration for support of the holder. The stem member may have a wire inside covered by a soft flexible material. There may also be provided a separate stem piece integrally attached with the stem member and adapted to form a perch.

BRIEF DESCRIPTION OF THE DRAWINGS

Numerous other objects, features and advantages of the present invention should now become apparent upon a reading of the following detailed description taken in conjunction with the accompanying drawings, in which:

FIG. 1 illustrates one embodiment of a bird feeder in accordance with the present invention employing a pivot clamp for attachment;

FIG. 4 illustrates a bird feeder with a positionable handle;

FIG. 5 illustrates a bird feeder with an attachment by means of an elastic band;

FIG. 7 illustrates a series of additional concepts for feeders similar to those described in FIGS. 1-6;

FIG. 14B is a plan view of the embodiment of FIG. 14A;

DETAILED DESCRIPTION

Figure 2B:
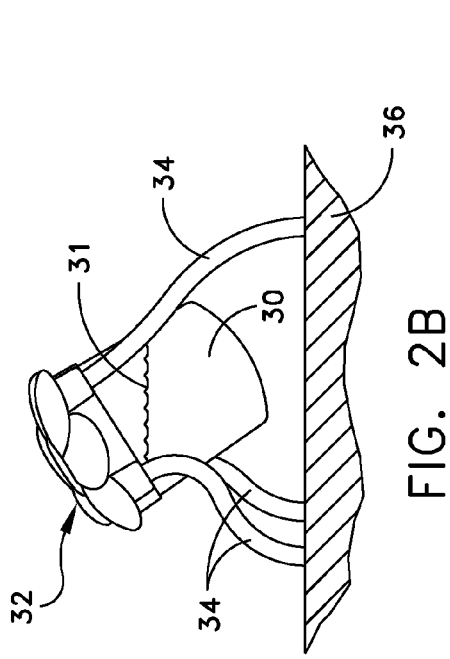
FIG. 2 illustrates a feeder with a series of legs for attachment support.
Figure 2D:
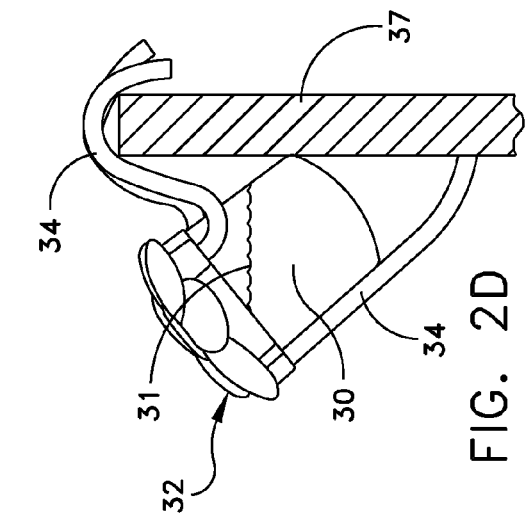
Figure 2A:
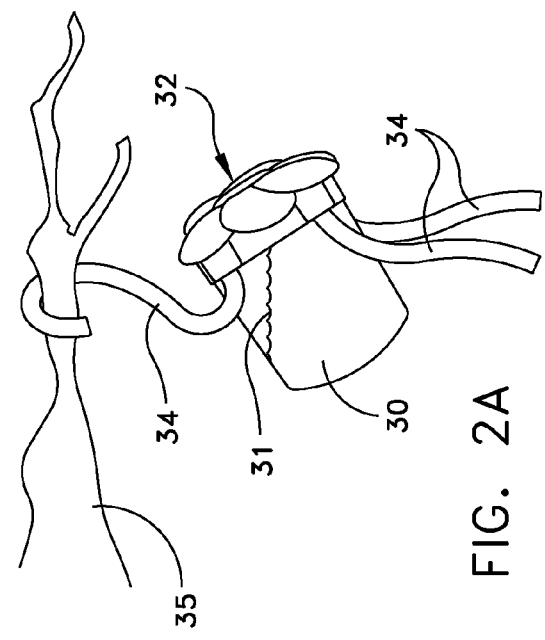
Figure 2C:
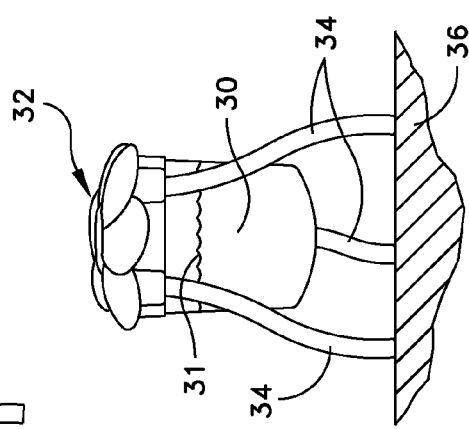

There are described herein a number of different embodiments of a portable, miniature bird feeder that is meant primarily for feeding hummingbirds, although it may also be used for feeding other small birds. In addition to being small and thus readily portable, the feeders that are described herein are also characterized by a unique and simple attachment means so that the feeders can be positioned virtually anywhere. The attachment means provides a way to attach the feeder to any deck rail, arbor rod, chair arm, finger, toe, hat brim, umbrella pole, table top, bird bath, and virtually any object that one would find outside in the yard. Alternatively, the feeder may even be planted in or attached to a flower box. Also, in addition to hanging or other means of attachment, the bird feeder may be constructed so as to be self-standing.

In all of the embodiments that are described herein, the bird feeder is comprised of a feeder bowl that may be used for storing bird seed or other food products, such as meal worms, nectars, fruit, jelly, or suet. The bowl is preferably transparent or translucent so the observer can see the level of feed in the bowl. In some embodiments described herein the bowl may have a flat bottom surface. This flat surface allows the holder to rest on a flat surface such as a table surface. This enables the bowl to be more easily filled or refilled without spilling the nectar.

In addition to the feeder bowl, there is a top that is provided on the feeder, and the top preferably has one or more ports through which the bird accesses the feed in the holder. In the preferred embodiment, the top may be screwed on the base or feeder bowl. The top is preferably formed as a flower head, and in this regard the preferred embodiment of the present invention is that illustrated in FIG. 6. This flower-head design provides a very aesthetic appeal to the bird feeder, and in some sense almost makes it not look like a typical bird feeder. In addition to the flower head, other tops may be used, such as a lady bug or butterfly.

Another feature of the present invention particularly relating to the preferred embodiment of FIG. 6 is the use of a side stem that can be positioned as a perch. Although most hummingbirds hover, some may choose to sit on a perch. Also, the preferred embodiment of FIG. 6 shows a flower type cover in which case the pedals form a type of perch adjacent to the feed port.

As mentioned previously, the preferred cover is screwed onto the base. This arrangement makes it quite easy to thoroughly clean the bird feeder. The feeder itself can be made of various types of materials including glass, plastic or metal. The bowl that holds the seed is preferably transparent so that the level of the nectar is visible. Alternatively, the cover may be secured with the holder in other ways. For example, there may be provided a snap fit of the cover with the holder. A tab and slot arrangement may also be used for securing the cover to the holder The first embodiment of the present invention is illustrated in FIG. 1 with the feeder disposed in two different orientations. The feeder is comprised of a seed or nectar holder 10 that is preferably transparent so as to be able to see the level 11 of the nectar within the holder 10. The holder 10 has the cap or cover 12 disposed thereover. Both the holder 10 and the cap 12 are preferably constructed of a plastic material, and the holder 10 is preferably transparent. The cover or cap may be attached to the holder 10 in a variety of different ways and is preferably screwed onto the holder 10. The cap or cover 12 is provided with one or more open ports 14 through which access is provided to the hummingbird to the feed holder. This particular embodiment also includes, integral width of the cover 12, an annular ridge 16 that forms a perch for the bird. The ridge 16 may alternatively be attached to the holder 10.

The bottom of the feed holder 10 provides a socket 18 from which the bird feeder is supported. This support is provided by a pivot clamp 20 that includes arms 22 and 24 that are pivotal about the pivot point or joint 25. A link 26 connects the pivot clamp 20 to the socket 18. The link 26 may have a ball at the end where it connects with the socket 18 and has some type of a pivot joint end at the joint 25.

FIG. 1A illustrates the pivot clamp 20 used as a base for supporting the feed holder. In FIG. 1A the feed holder is self-supporting. The link 26 may be pivoted with both the clamp 20 and the seed holder 10 so that it can be moved into various different positions and maintained in those positions. In that regard, the link 26 is preferably attached to the clamp 20 with a somewhat tight fit so that once the holder is positioned it will stay in that position until the link is rotated to a different position. The connection at the socket 18 also preferably provides a rather tight fit so that the holder can be maintained in an upright position as shown in FIG. 1A, if desired.

FIG. 1B illustrates the pivot clamp 20 as clamped about a shelf or rail 28. Even in this position, the bird feeder can be positioned in a variety of different orientations by means of pivoting at either end of the link 26. Again the connections at the ends of the link 26 are preferably relatively tight so that once a position is set the holder stays in that position.

FIG. 2 illustrates another embodiment of the present invention. This embodiment includes a nectar holder 30 and a cap 32. As with the first embodiment, the cap 32 may be secured to the holder 30 in a number of different ways. A preferred way is to have the cap screw on to the holder. Alternatively, a tight slide fit may be used between the cap and holder. In the embodiment of FIG. 2, it is noted that the cap has a somewhat decorative effect. The cap is provided with one or more through ports to provide access to the inside of the holder 30. FIG. 2 illustrates the holder 30 as being transparent, illustrating the liquid line of the nectar at 31.

FIG. 2 also shows an attachment or support means in the form of a series of support legs 34 that enable the feeder to be supported in a number of different ways including for self-support. FIGS. 2B and 2D illustrate self-supporting arrangements. FIG. 2A illustrates one leg 34 supporting the feeder from a branch 35. In other embodiments the series of legs 34 may be used to self-support the holder from a base 36. In still another embodiment of the present invention shown in FIG. 2D, the legs 34 may be used to support the holder from an upright piece 37.

In the embodiment of FIG. 2 there is a plurality of legs 34. There may be three or four of these legs. Each of the legs is flexible but once bent will maintain the bent configuration. In this regard refer to FIG. 6A and a typical leg construction that may include an outer foam or rubber sheath and an inner wire that provides some degree of stiffness to the leg construction. Also, in for example FIGS. 2A and 2D any one leg 34 that is not used for support of the feeder can be bent into a position wherein the end of the leg functions as a perch for the hummingbird. For example, in FIG. 2A one or more of the lower positioned legs 34 may be bent upward about 180 degrees so the free end thereof is positioned close to a feed port. Moreover, even in the position of FIG. 2b or 2C if there are a sufficient number of support legs to stabilize the holder then at least one leg that is unused for support can be bent upwardly to function as a perch. See also FIG. 15B for an illustration of using an unused leg as a perch.

Reference is now made to FIG. 3 for still a further embodiment of the present invention. This embodiment includes a substantially spherical holder 40 having a cap 42 that is secured to the holder 40. As illustrated in a perspective view in the embodiment of FIG. 3, the cap 42 is provided with a single centrally disposed port 44 to provide access by the bird to the nectar within the spherical holder 40. The cap 42 may be screwed onto or may be snap fit with the spherical holder 40.

Figure 3A:
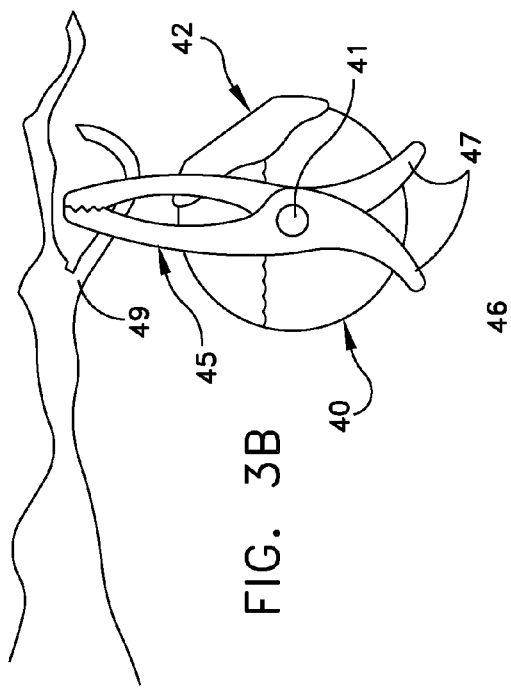
FIG. 3 illustrates a bird feeder with a clamp hanger arrangement for attachment.
Figure 3B:
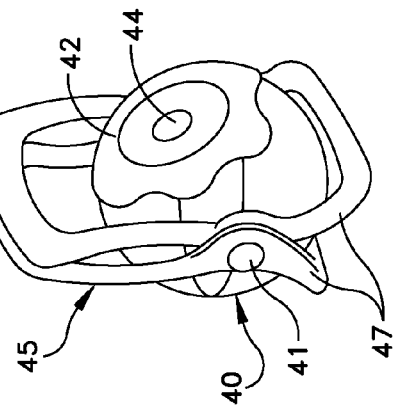
Figure 3C:
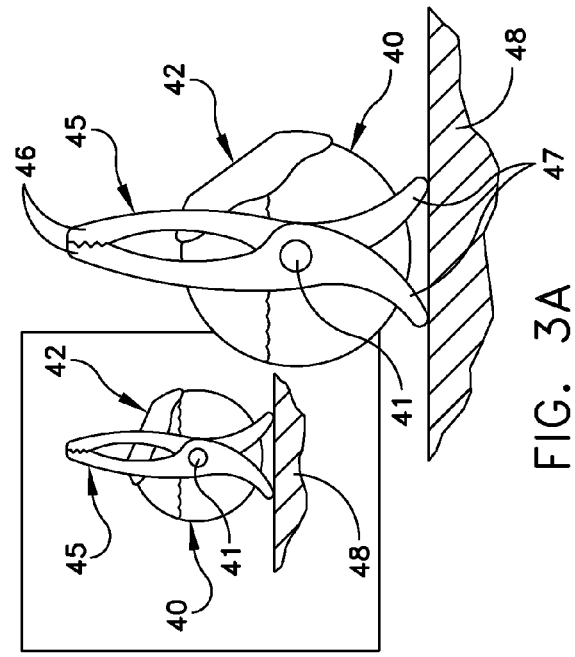
Figure 3D:
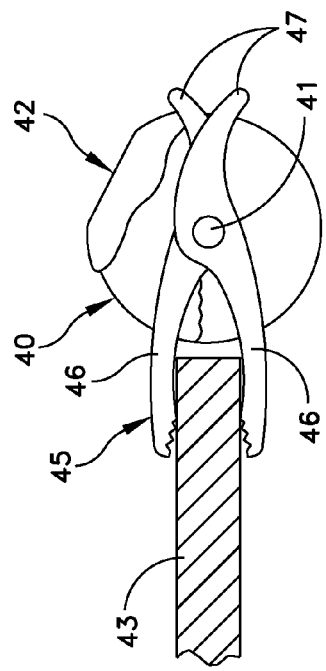

Refer in FIG. 3D also to the perspective view that illustrates the clamp hanger 45. The hanger 45 is supported from the spherical holder 40 at the pivot 41. The clamp hanger 45 includes a pair of jaws 46 at one end and a pair of legs 47 at the other end. The attachment between the clamp hanger 45 and the holder 40 is preferably a relatively tight fit so that the position therebetween can be maintained once it is set, as discussed before. Also, the clamp hanger 45 preferably has associated therewith a biasing means, usually in the form of a spring, so as to maintain a force on the jaws toward a closed position thereof.

FIG. 3 illustrates a number of different ways that the clamp hanger can be used in this embodiment of the invention. In one embodiment shown in FIG. 3A the legs 47 are used for supporting the bird feeder from a base 48. In another embodiment of the invention shown in FIG. 3B, the jaws 46 of the hanger may be used for supporting the feeder from a branch 49 or the like. In still another embodiment of the present invention, as shown in FIG. 3C, the jaws 46 may be used for grasping a rail 43 in supporting the feeder.

FIG. 4 illustrates still another embodiment of the present invention. This embodiment includes a feed holder 50 and a cap 52. As in previous embodiments, the cap 52 may be secured to the holder 50 in a number of different ways. The cap 52 is provided with one or more through ports 54 to provide access to the inside of the holder 50. Refer to FIG. 4D showing the use of two ports 54. The holder 50 is also preferably transparent so that the level of the feed within the holder can be observed.

FIG. 4 also shows an attachment means in the form of a U-shaped handle 55 that has opposite ends received within a slot 56 in the holder 50. The slot 56 enables the handle 55 to be moved such as in the direction indicated by the arrows A in FIGS. 4B and 4D. The opposite ends 57 of the handle 55 fit within the slot 56 and may be arranged so as to interlock in the slot in various positions. For this purpose the ends 57 are preferably disposed at a right angle as shown in FIG. 4D. The interlock of the handle 55 is preferably relatively tight so that the position can be maintained once set.

FIG. 4A also illustrates, in one position, the handle 55 being hung from a branch 58. The handle 55 is also shown in FIG. 4C in a position where the holder is tilted, or, alternatively, is simply supported on a flat surface 59, as shown in FIG. 4B. The ends 57 of the handle 55, as indicated previously, may slide within the slot 56. In addition, the ends 57 of the handle may also be locked in a particular position in the slot 56 so as to enable the holder to be tilted as illustrated in FIG. 4C. The ends 57 may be associated with a detent arrangement 51 to enable the holder to be tilted in different positions.

Reference is now made to FIG. 5 for a further embodiment of the hummingbird feeder of the present invention. In this embodiment an elastic band is used for securing the feeder to objects or for hanging the feeder from objects. The feeder includes a base holder 60 that may be provided with legs 61 for support of the holder. Two or more legs 61 may be provided. FIG. 5A illustrates a nectar 62 within the holder 60. The holder is preferably transparent or translucent so that the level of the nectar within the holder can be viewed. In addition to using a nectar, various other types of feed may also be stored in the holder.

The feeder of FIG. 5 also includes a cap or cover 64 that may be screwed onto the top of the holder or may be attached to the holder by other means. The cap or cover 64 is provided with through ports 65 to provide access for the bird into the holder. Two or more ports 65 may be used.

As indicated previously, the feeder illustrated in FIG. 5 is supported primarily by means of an elastic band 66 that has end loops 67. The cap or cover 64 is provided with diametrically disposed flanges 68 over which each of the end loops 67 extend. In one of the positions illustrated in FIG. 5A both ends of the elastic band 66 are disposed about the flanges 68. In another embodiment that is illustrated in FIG. 5B the elastic band 66 is disposed only about one of the flanges 68 and the construction of the other flange 68 is plainly shown. FIG. 5C shows the holder in a self-supporting arrangement. FIGS. 5D and 5E shows the elastic band 66 extending about different types of support structures 69 so that the feeder can be supported from either above, below or from the side.

Reference is now made to FIG. 6 for a further embodiment of the present invention in which the attachment means employs a flexible member, flexible leg or vine. In this embodiment the attachment means is in particular a stiff cable or wire arrangement that enables the feeder to be disposed in a variety of different positions and locations.

Figure 6A:
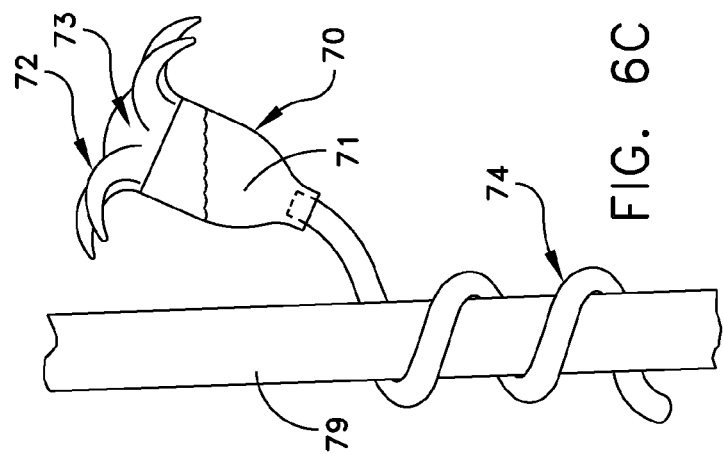
FIG. 6 illustrates a bird feeder in which the attachment is by means of a flexible line.
Figure 6B:
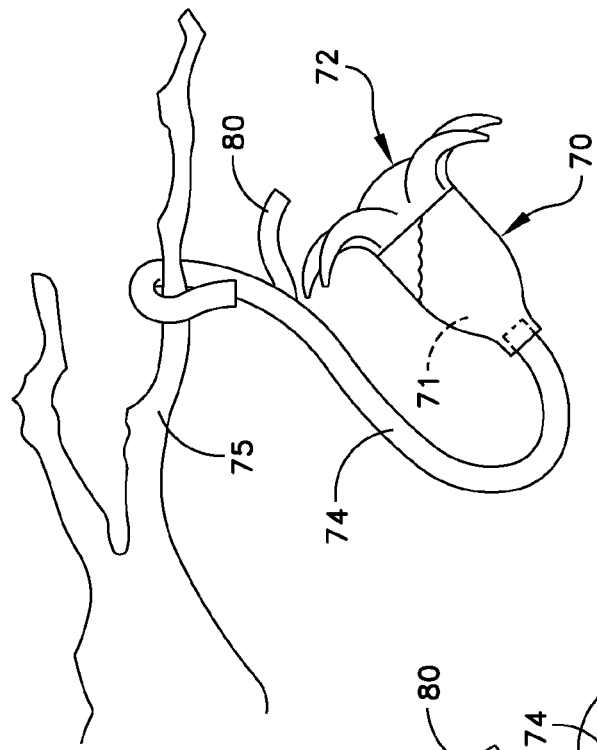
Figure 6C:
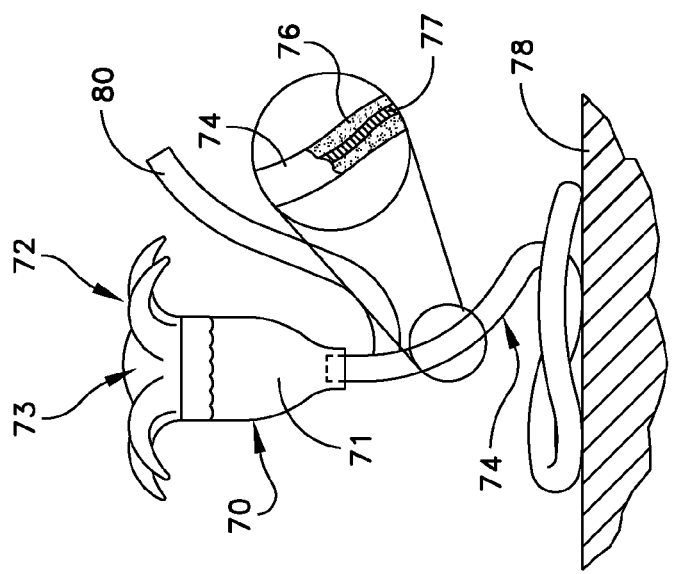

The bird feeder illustrated in FIGS. 6A-6C includes a base holder 70 for supporting feed such as nectar 71. The feeder also includes a cover or cap 72 that, in the embodiment of FIG. 6A, is illustrated as having a flower-like configuration. The cover 72 is provided with one or more open ports 73 through which the bird may feed. The cap 72 may be screwed onto the holder 70 or may be attached in other readily detachable ways. The petals of the flower cover form a type of perch arrangement, for some types of small birds.

The holder is supported by means of an attachment device that in this embodiment is a flexible line or vine 74. FIG. 6A also shows further details of this flexible line which preferably includes a center wire 77 and an outer rubber or foam sheath 76. This arrangement enables the flexible line 74 to be bent into various different configurations. Because of the use of a center wire, once the flexible line is bent into any particular configuration it is maintained in that configuration. FIGS. 6A-6C illustrates various configurations for the flexible line 74.

In FIG. 6B in one embodiment the flexible line 74 is curled at its distal end and supported from the branch 75. In another arrangement illustrated in FIG. 6A the bottom end of the flexible line 74 is bent or coiled into a configuration where it forms a stand for the holder 70 so that it can be maintained in an upright position on the base 78. In still another embodiment illustrated in FIG. 6C the flexible line 74 is wound about an upright pole 79. In this instance, the holder is illustrated as tilted slightly at an angle to the upright pole 79.

In the embodiment of FIGS. 6A and 6B there is also schematically illustrated different stems 80 that may be employed in association with the main flexible line 74. These side stems 80 may be used as a perch for the bird. The stem 80 may be constructed substantially the same as the main flexible line 74 including a center wire and an outer foam or rubber sheath. The stem 80 is integrally attached to the main line 74. In particular, in the depiction of FIG. 6A, the stem 80 is illustrated as bent upward to be positioned close to the cap 72, thus forming a side perch for the bird. The stem 80 in FIG. 6A is bent close to the cap or cover 72 to provide ready access for the hummingbird to a feeding port at the cap. See also a description later in FIG. 15B showing the use of an unused leg as a perch.

Reference is now made to FIG. 7 for an illustration of sketches of additional embodiments of the feeder of the present invention. Many of these include attachment means similar to those described in FIGS. 1-6. The feeder itself in FIG. 7 is illustrated in a number of different configurations and shapes. Also, the cover or cap is also illustrated in different configurations. The attachment means illustrated in FIG. 7 takes on various configurations including clamping arrangements and ball and socket arrangements. One embodiment shown in FIG. 7D includes a flexible neck 90 for support between the base clamp 91 and the feed holder 92. Other arrangements illustrated in FIG. 7 include clamping members with pivotal or ball and socket joints at the feeder. See, for example, embodiments in FIGS. 7G, 7J and 7K, respectively at 93, 94 and 95.

FIG. 7A shows a holder like that shown previously in FIG. 3. FIGS. 7B, 7C, 7E and 7F also show similar holders. FIG. 7D shows an embodiment like that shown in FIG. 1 but with the link replaced with a flexible length 90. FIG. 7I shows a different style of cover. FIG. 7J shows the use of a socket 94 at the base of the holder and between the holder and base clamp. Other socket arrangements are shown in FIGS. 7G and 7K.

In all of the embodiments described herein, the cover or cap has at least one port through which the bird can access the interior of the feed container. One of the unique aspects of the embodiments of the present invention is the miniature nature of the bird feeder. The depth of the holder of the feed, such as a nectar, is preferably in a range of 1-2.5 inches. Accordingly, the bird feeder described herein is of relatively small size. This also makes for a very portable feeder and one in which the attachment means provides a great deal of versatility as far as where the feeder can be attached.

Reference is now made to additional embodiments of the present invention illustrated in FIGS. 8-15. These additional embodiments have some characteristics similar to that shown in the previous embodiments of FIGS. 2 and 6. Thus, each of these additional embodiments has, as a means of support, a series of elongated legs like those described in FIGS. 2 and 6. For the description of a typical leg construction, reference may be made to FIG. 6A and the flexible leg 74 described therein which is comprised of an outer rubber or foam sheath 76 and a centrally disposed wire 77. This combination provides a relatively strong leg structure that can readily support the feeder but yet which is flexible so that it can be moved into different positions as previously described in FIGS. 2 and 6.

In the additional embodiments described in FIGS. 8-15, there is a basic holder for the nectar and usually also a cap that can be removable for filling the holder.

Figure 8:
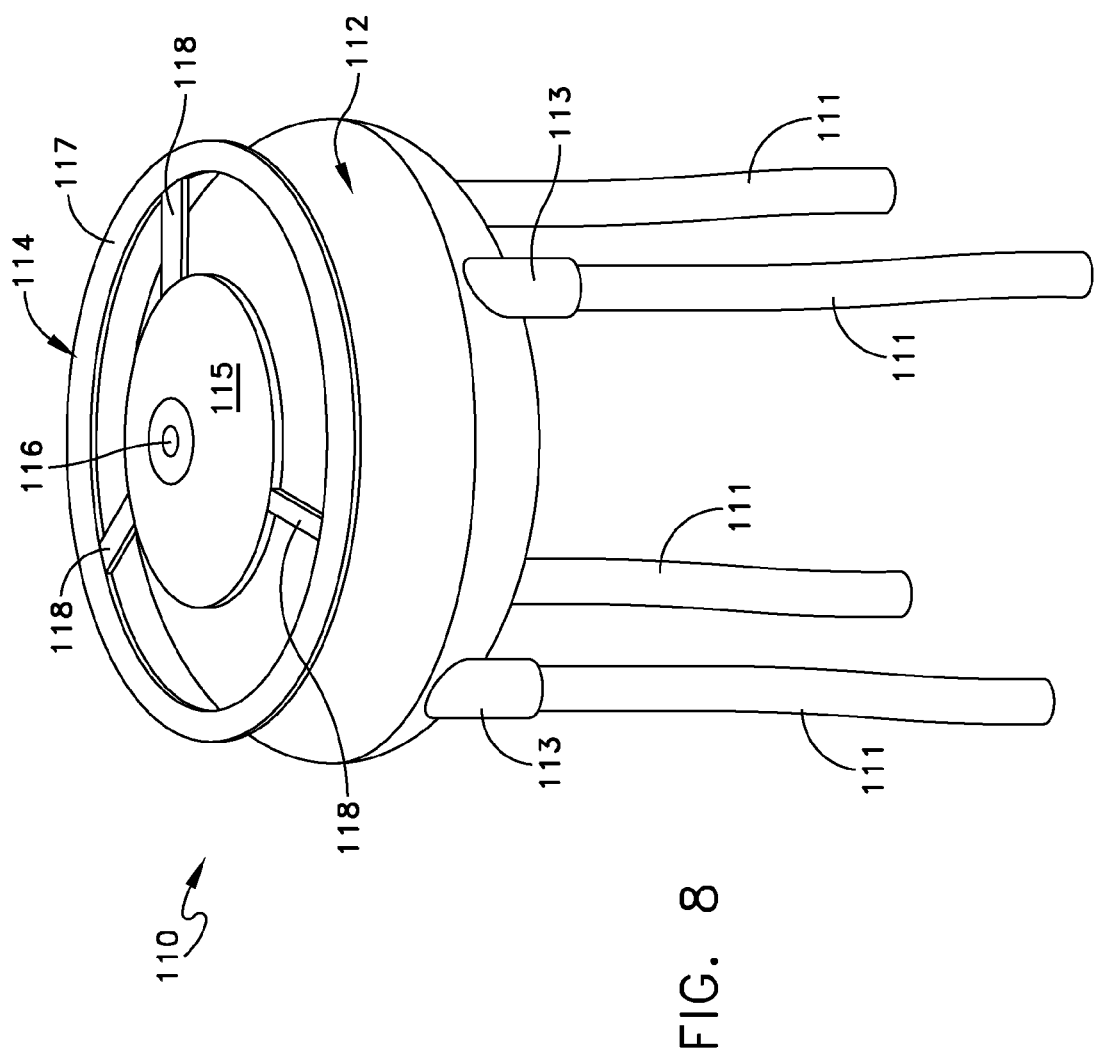
FIG. 8 is a perspective view of another embodiment of the present invention.

The embodiment of FIG. 8 illustrates a hummingbird feeder 110 that is comprised of a holder 112 and a circular perch 114. The perch 114 is suitably attached at the top of the holder 112. The holder 112 contains a certain amount of nectar. FIG. 8 also illustrates a port 116 through which the hummingbird can access the nectar within the holder 112. The perch 114 is comprised of a center piece 115 having the port 116 extend therethrough; an outer ring 117 and interconnecting radial struts 118. The perch 114 is conveniently disposed adjacent to the port 116 so that the hummingbird can readily use the perch for support.

FIG. 8 also illustrates the support legs 111 which each may be of the type illustrated previously in FIG. 6. Each of the legs 111 connects to the holder 112 at a respective receiving post 113. Each of the legs 111 may be inserted within the receiving post 113. The post 113, in turn, may be integrally formed with a sidewall of the holder 112.

Figure 9:
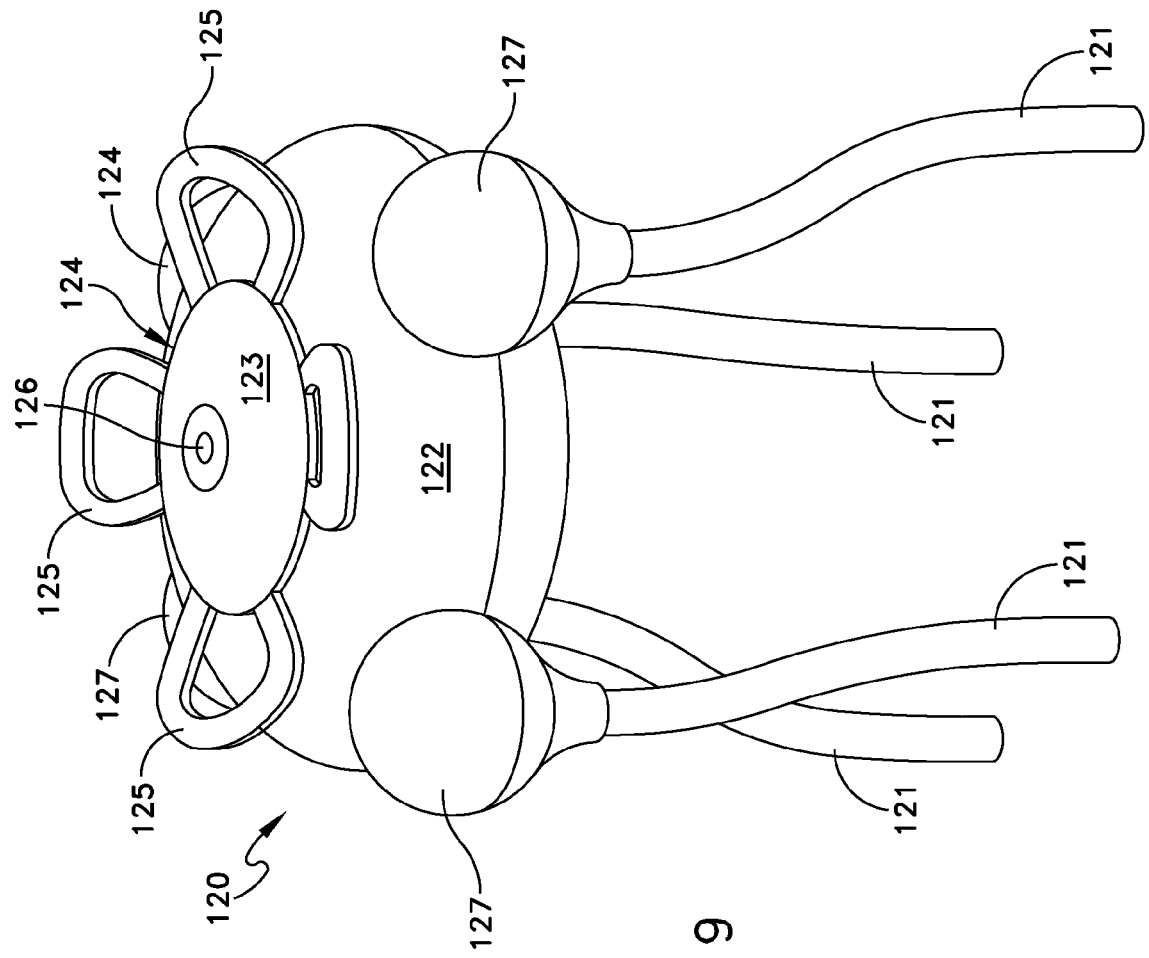
FIG. 9 is a perspective view of still another embodiment of the present invention.

Reference is now made to FIG. 9 for a perspective view of still another embodiment of the present invention. FIG. 9 illustrates the hummingbird feeder 120 as comprised of a main holder 122 and a perch assembly 124. The perch assembly 124 is comprised of four separate individual U-shaped perches 125 that are each supported from the center piece 123. The perch assembly 124 may be constructed of plastic and each of the separate perches 125 may be integrally formed with the center piece 123. The access port 126 is shown at the center of the center piece 123.

In the embodiment of FIG. 9 there are also provided four legs 121. Some of these legs 121 are shown in a slightly twisted position. Each of the legs 121 is supported at a receiving sphere 127. Each of the legs 121 is dimensioned to slide within a receiving passage in each of the respective spheres 127. Each of the spheres 127 is preferably disposed about the holder 122 at 90 degree intervals.

Figure 10:
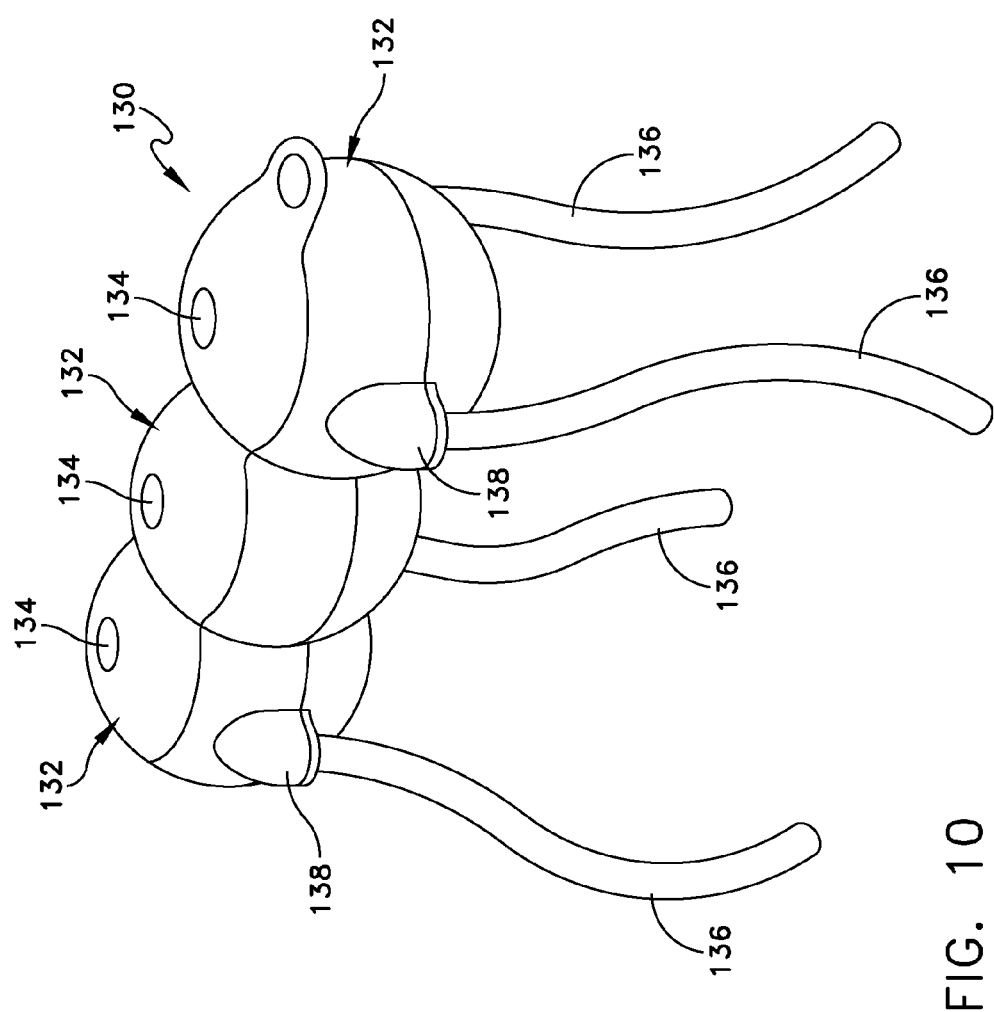
FIG. 10 is a perspective view of a further embodiment of the present invention.

Another embodiment of the present invention is illustrated in FIG. 10. This embodiment includes a hummingbird feeder 130 that includes a plurality of spherical segments 132. These spherical segments 132 are integrally interconnected and form a "bug" configuration. Each of the segments 132 is provided with an access port 134.

In the embodiment of FIG. 10 there are also provided four legs 136 that may be of the construction illustrated in FIG. 6. Each of the legs 136 is supported from a receiving post 138. In the perspective view of FIG. 10 only two posts 138 are illustrated. However, it is understood that, by virtue of supporting four legs 136, there are also accommodating posts on the opposite side of the respective two end segments 132.

Figure 11:
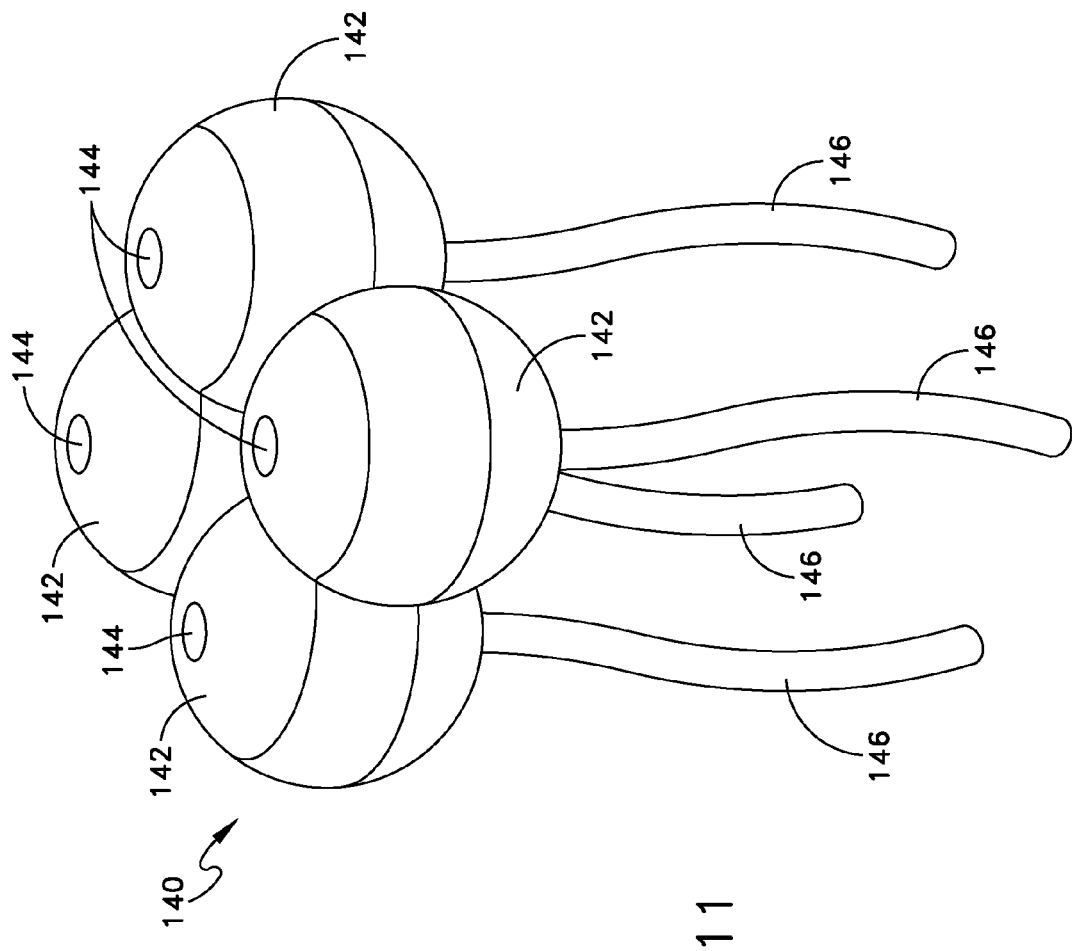
FIG. 11 is a perspective view of still another embodiment of the present invention.

Reference is now made to another embodiment of the present invention illustrated in FIG. 11. This includes a hummingbird feeder 140 that is also comprised of spherical segments 142. In the embodiment of FIG. 11 there are four segments 142 and they are joined together in a square pattern. Each of the spherical segments 142 has a corresponding axis port 144. The embodiment of FIG. 11 also illustrates a corresponding set of four legs 146. In order to support each of the legs 146, a bottom of each of the spherical segments 142 has an opening or a blind passage into which a corresponding leg 146 is inserted and secured. In this embodiment as well as in the previous embodiments of FIGS. 8-10, the legs may be secured by means of an adhesive.

Figure 12:
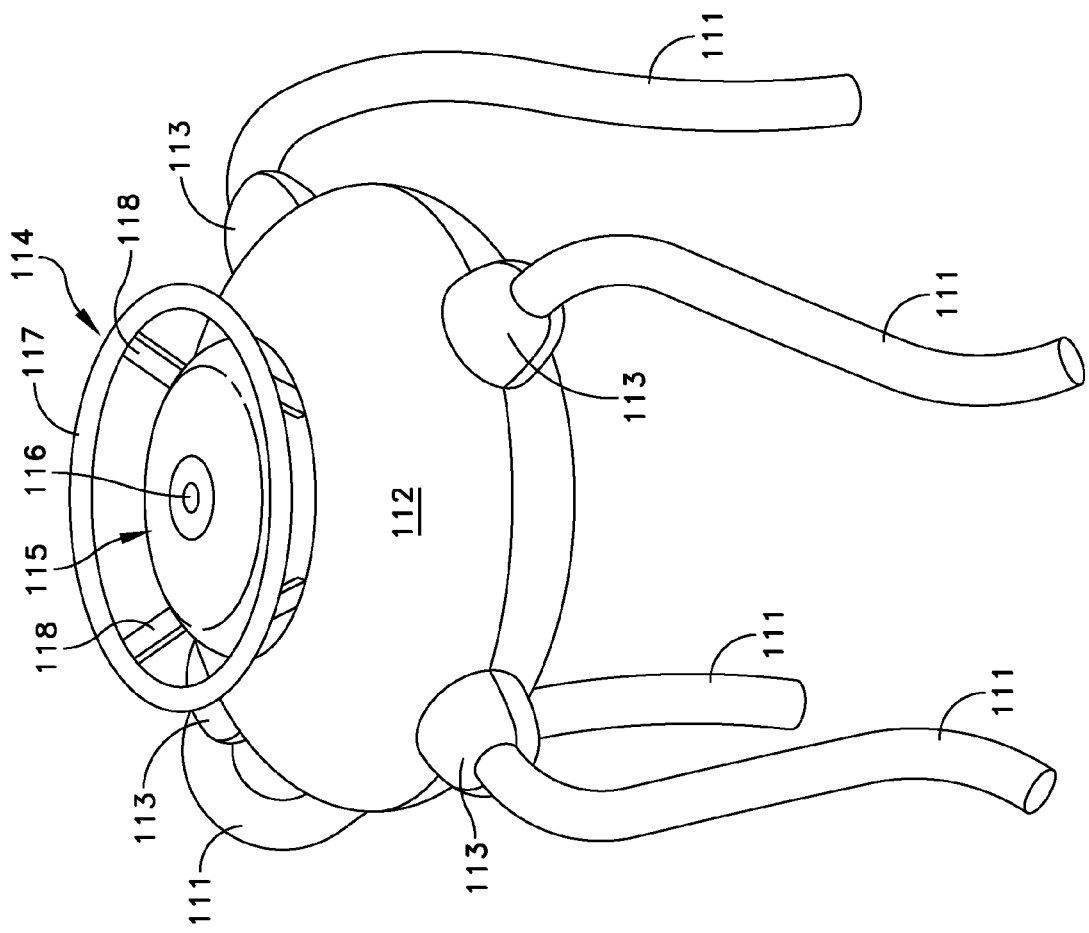
FIG. 12 is a perspective view of still a further embodiment of the present invention.

Reference is now made to another embodiment of the present invention illustrated in FIG. 12. This embodiment has many similarities to that described in the embodiment of FIG. 8 and thus the same reference characters are being used in describing this embodiment. The embodiment of FIG. 12 illustrates a hummingbird feeder 110 that is comprised of a holder 112 and a circular perch 114. The perch 114 is suitably attached at the top of the holder 112. The holder 112 contains a certain amount of nectar. FIG. 12 also illustrates a port 116 through which the hummingbird can access the nectar within the holder 112. The perch 114 is comprised of a center piece 115 having the port 116 extend therethrough; an outer ring 117 and interconnecting radial struts 118. The perch 114 is conveniently disposed adjacent to the port 116 so that the hummingbird can readily use the perch for support.

FIG. 12 also illustrates the support legs 111 which each may be of the type illustrated previously in FIG. 6. Each of the legs 111 connects to the holder 112 at a respective receiving post 113. Each of the legs 111 may be inserted within the receiving post 113. The post 113, in turn, may be integrally formed with a sidewall of the holder 112.

The main difference between the embodiment of FIGS. 8 and 12 is that the perch 114 is smaller in diameter in FIG. 12. Also, the receiving posts 113 support the legs 111 from the side of the holder 112 and thus at the point where the legs 111 extend from the post 113, the legs extend substantially radially. In FIG. 8 each of the receiving posts 113 extend downwardly.

Figure 13:
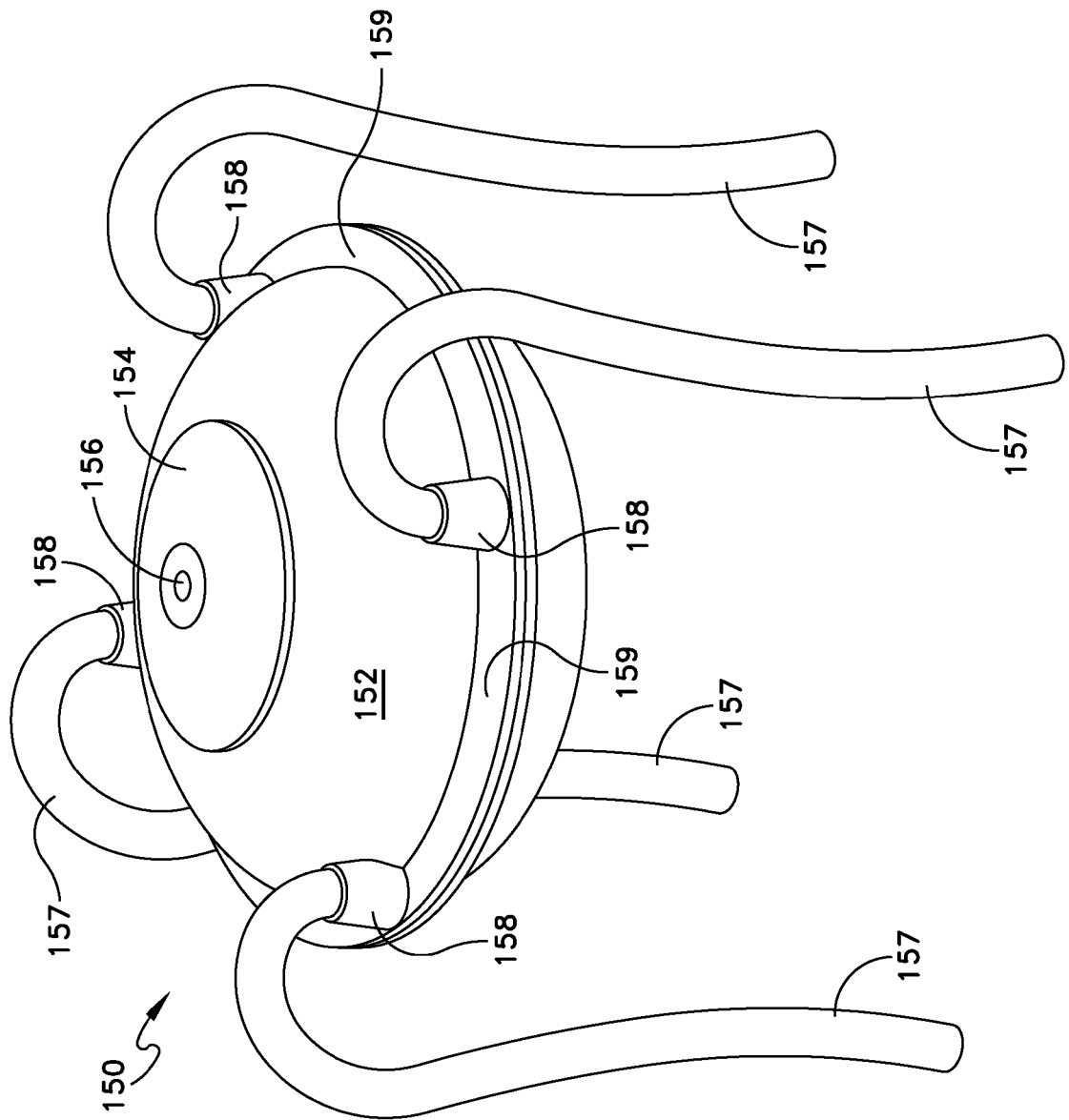
FIG. 13 is a perspective view of still another embodiment of the present invention.

FIG. 13 is a perspective view of another embodiment of the present invention wherein the legs extend from an upper surface of the holder. In the embodiment of FIG. 13, the hummingbird feeder 150 is comprised of a holder 152 having a top cap 154. The cap 154 is provided with an access port 156. The embodiment of FIG. 13 also illustrates four legs 157. Each of the legs 157 is supported from a receiving post 158. The receiving posts 158 are disposed about a circular rim 159 of the holder 152. Each of the receiving posts 158 may be appropriately attached or integrally formed with the rim 159. Each of the receiving posts 158 has an opening or blind passage that receives an end of each of the respective legs 157. In the embodiment of FIG. 13 the legs 157 are shown bent in a flexible manner downwardly from the receiving post 158. Thus, in the embodiment of FIG. 13, the four legs 157 are arranged to provide convenient support for the holder 152.

Figure 14A:
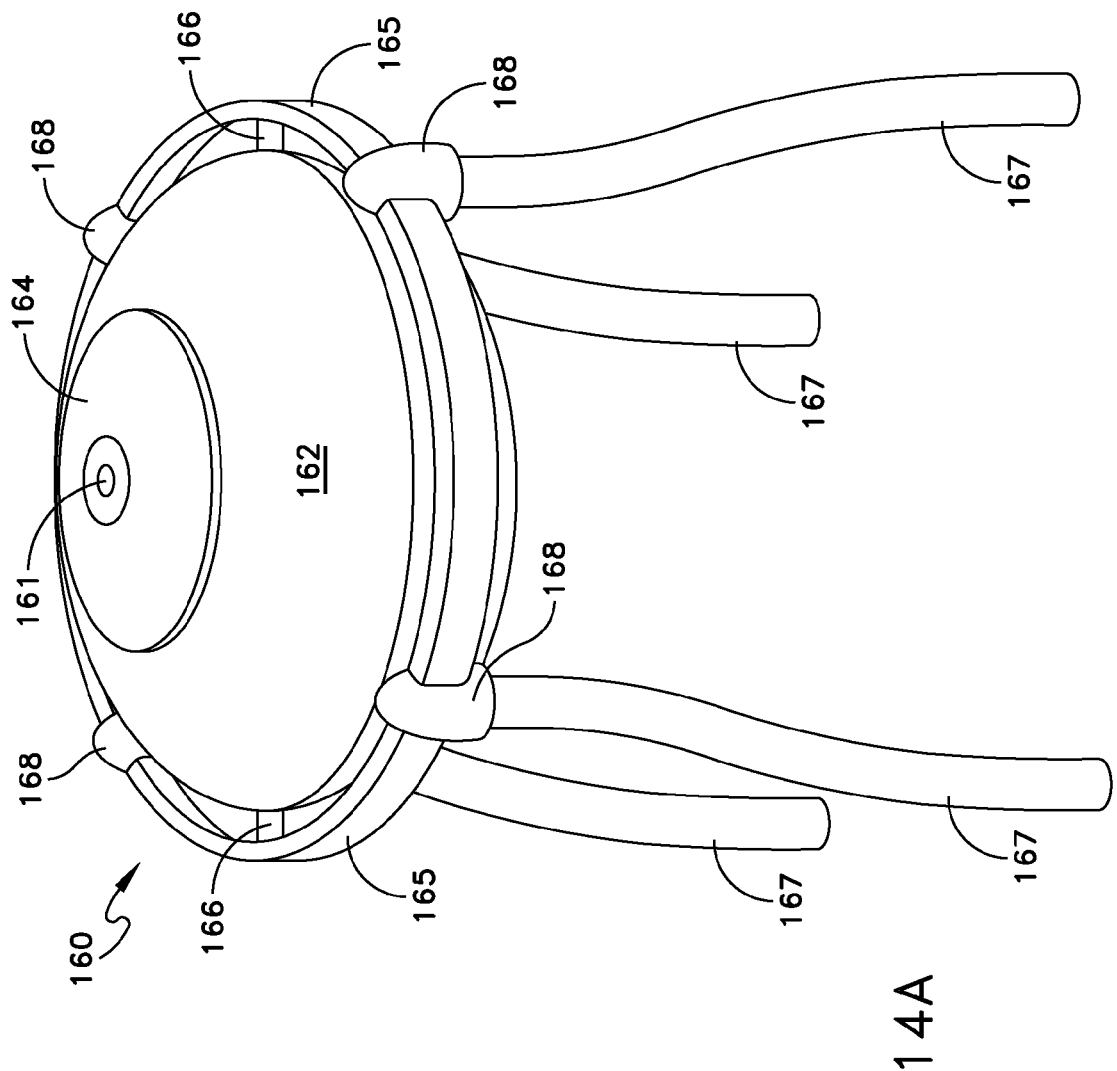
FIG. 14A illustrates still a further embodiment of the present invention.

Reference is now made to another embodiment of the present invention illustrated in FIGS. 14A and 14B. This embodiment includes a hummingbird feeder 160 that is comprised of a holder 162 having a cap 164 at the top thereof. The cap 164 has an access port 161. The holder 162 supports an annular track 165 that is disposed circumferentially about the holder 162. The annular track 165 is supported from the holder by means of a series of support struts 166. Four struts 166 may be employed disposed at 90 degree intervals about the track 165. In the disclosed embodiment the track 165 has a rectangular cross section. Refer also to the plan view of FIG. 14B that shows the four struts 166 and the track 165.

In the embodiment of FIGS. 14A and 14B, there are also provided four legs 167 that are each supported at receiving posts 168. The embodiment in FIGS. 14A and 14B provides for an adjustment of the position of the legs 167 by virtue of the associated receiving posts 168 being movable along the track 165. In this regard, refer to the plan view of FIG. 14B that shows in solid outline the position of the receiving posts 168. In FIG. 14B also note that alternate positions of one of the receiving posts 168 is shown in dotted outline. The arrow 169 is representative of a possible movement of the receiving post 168 on the track 165. Thus, reach receiving post 168 is provided with a through and rectangular shaped passage for receiving and moving along the track 165. The positioning of each of the respective receiving posts is somewhat limited by the position of the struts 166. In FIG. 14B it is noted that a receiving post and associated leg is provided, one in each of the separate quadrants between adjacent struts 166.

It is noted that in, for example, FIGS. 13 and 14, there is no perch provided. However, a perch arrangement such as shown in FIG. 8, 9 or 12 may also be provided in the hummingbird feeder construction illustrated in FIGS. 13 and 14.

Figure 15A:
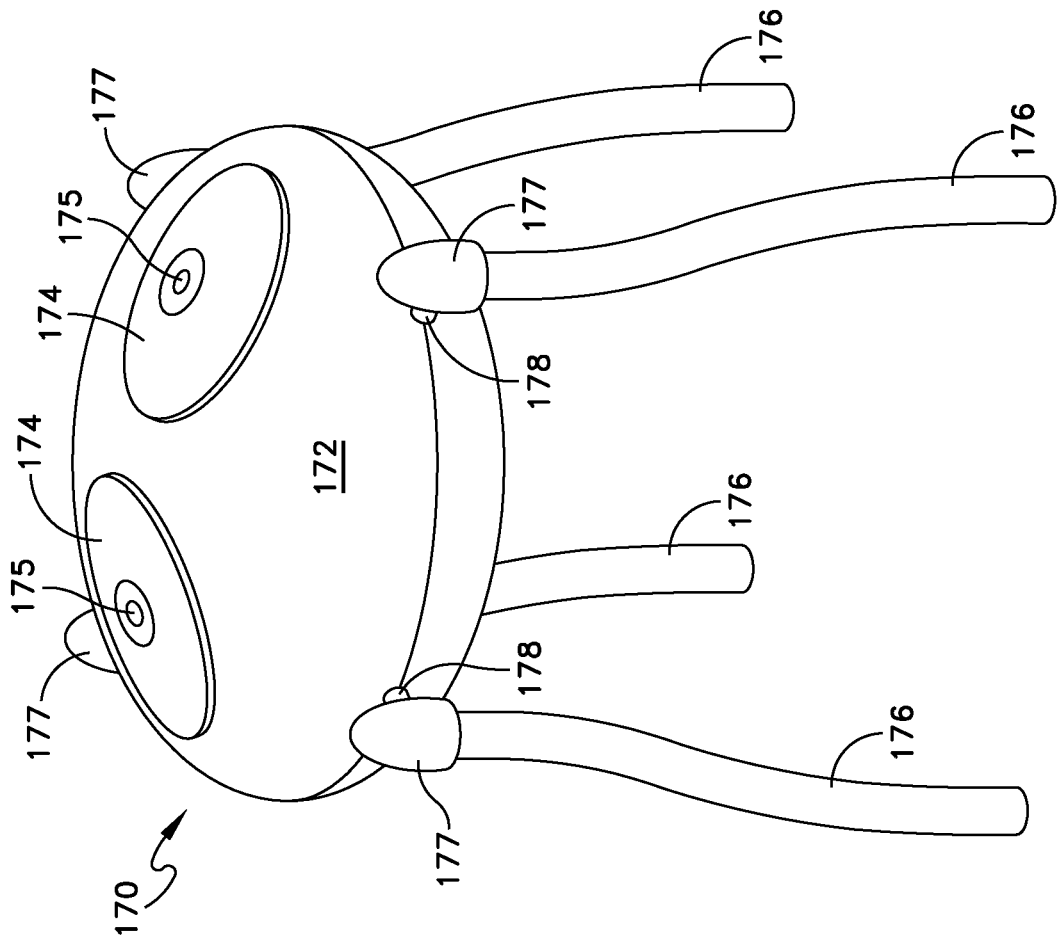
FIG. 15A is a perspective view of still another embodiment of the present invention.
Figure 15B:
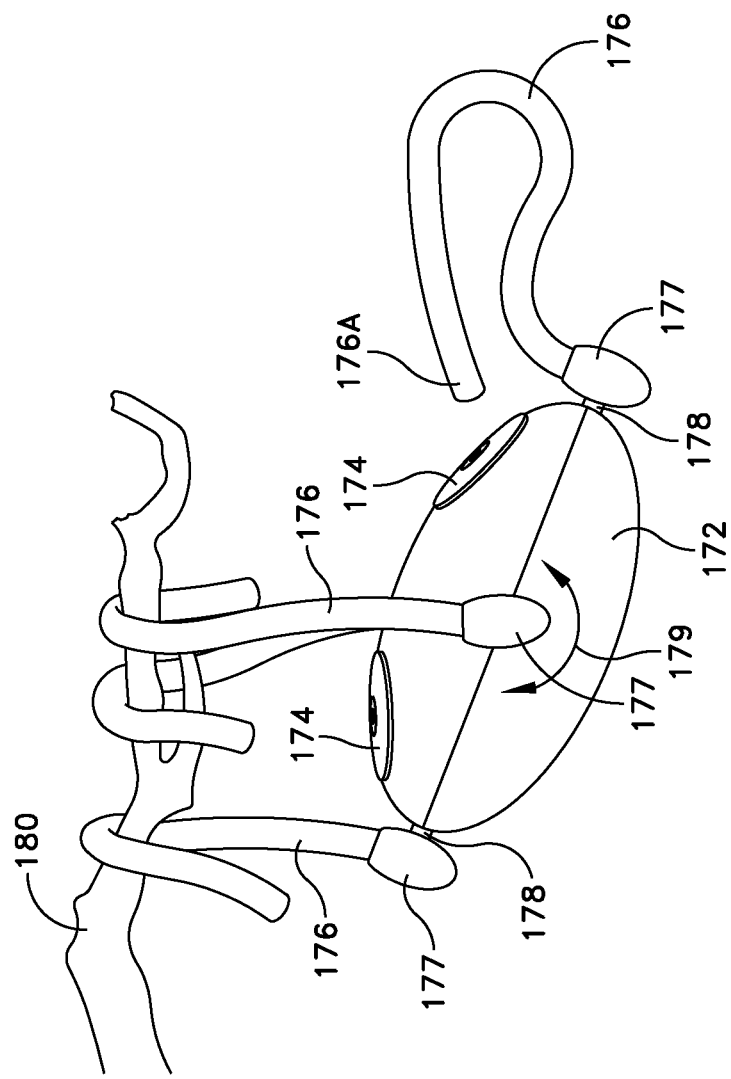
FIG. 15B is a side elevation view illustrating the operation of the embodiment of FIG. 15A.

A last embodiment of the present invention is illustrated in FIGS. 15A and 15B. In this embodiment the hummingbird feeder 170 is comprised of a holder 172 that has a pair of caps 174. Each of the caps 174 is provided with an access port 175. In this embodiment there are also provided four legs 176 each supported by means of a receiving post 177. In this embodiment, rather than having each receiving post 177 fixed to the holder 172, each receiving post 177 is pivotally attached to the holder 172. For this purpose there are provided four corresponding pivot members 178. These pivot members 178 enable each of the receiving posts 177 to pivot such as in the direction indicated in FIG. 15B by the arrow 179. In FIG. 15B it is noted that one of the receiving posts 177 may extend the leg 176 downwardly while two or more of the other receiving posts 177 have been pivoted so that the corresponding legs 176 thereof extend upwardly. FIG. 15B shows these upwardly extending legs 176 wrapped about an object 180. The pivot 178 preferably enables a full 360 degree rotation of the receiving post 177. Also, in this embodiment, four receiving posts 177 are used. In an alternate embodiment fewer or greater number of receiving posts may be employed. This also applies to earlier embodiments in FIGS. 8-14. Moreover, FIG. 15B also shows one of the legs 176, not used for support of the holder, turned so that it extends upwardly in a loop with a curved free end terminating at 176A so as to form an end perch for the hummingbird. FIG. 15B shows the perch end 176A positioned adjacent to one of the feed ports 174.

Having now described a limited number of embodiments of the present invention, it should be apparent to those skilled in the art that numerous other embodiments and modifications thereof are contemplated as falling within the scope of the present invention as defined by the appended claims. For example, the feeder that is described includes a cover that is provided with a feed port that is suitable for access by a small bird such as a hummingbird. However, in an alternate embodiment the cover may be optional or the opening or port in the holder may be made larger to accommodate other bird sizes.

The invention claimed is:

1. A miniature size bird feeder comprising:
a feed holder;
a cap or cover over the feed holder;
and an attachment means for supporting the feed holder;
said attachment means comprising a handle that has opposite ends attached to the holder;
wherein said handle includes a U-shaped shaft having opposite ends of the handle shaft disposed at a right angle;
wherein said holder includes top and bottom sections and an intermediate section between the top and bottom sections, said intermediate section having opposed planar wall portions;
wherein the top section of the holder receives the cap or cover and the cap or cover has at least one feed port to provide access to feed within the holder;

wherein the opposed planar wall portions of the holder each have an elongated linearly disposed slot extending along each planar wall portion;

wherein said elongated linearly disposed slots are diametrically disposed slots for accommodating respective right angle ends of the handle;

wherein the ends of the handle are constructed and arranged to slide within the elongated diametrically and linearly disposed slots;

including detents, one at each end of both elongated slots and in the form of an end concave detent for receiving one of the right angle ends of the handle; and wherein the depth of the detent is greater than the depth of the slot so that the right angle ends are held in the detent.

2. The bird feeder of claim 1 including a further planar wall portion at a side of the holder, said further planar wall portion having respective ends, and said opposed planar wall portions being disposed perpendicular to the ends of the further planar wall portion.

3. The bird feeder of claim 1 wherein each end concave detent is disposed interiorly of the slot.

4. The bird feeder of claim 3 wherein each of the opposed planar wall portions has a length that is greater than its width, and the elongated slot extends along the length of each planar wall portion.

5. The bird feeder of claim 4 wherein each end concave detent is also disposed within a body of the feed holder.

6. The bird feeder of claim 5 wherein the concave detent has a circular end shape.

7. The bird feeder of claim 6 wherein each slot extends a major distance of the length of each opposed planar wall portion.

8. The bird feeder of claim 7 wherein the handle is locked in a particular position in the slot so as to enable the holder to be tilted.

9. The bird feeder of claim 8 wherein the handle fits within the slot and is arranged so as to interlock in the slot in various positions.

10. The bird feeder of claim 6 wherein the ends of the handle fit relatively tight in the handle slot so that the handle position can be maintained once set.

11. The bird feeder of claim 4 wherein the feed holder has an axis that extends between the top and bottom sections and the elongated slot extends orthogonal to the feed holder axis.

12. The bird feeder of claim 11 wherein the handle extends in a plane and, when the feed holder is hung from an overhead object, the plane of the handle is orthogonal to the direction of the elongated slot.

13. The bird feeder of claim 12 wherein each concave detent has a circular end shape and each right angle end of the handle also has a circular shaped free end.

14. The bird feeder of claim 13 wherein the circular end shape of the detent matches the circular free end of the right angle end of the handle to enable tilting of the handle relative to the feed holder.

15. The bird feeder of claim 4 wherein each concave detent has a circular end shape and each right angle end of the handle also has a circular shaped free end.

16. The bird feeder of claim 15 wherein the circular end shape of the detent matches the circular free end of the right angle end of the handle to enable tilting of the handle relative to the feed holder.

17. The bird feeder of claim 16 wherein each elongated slot extends substantially at the midpoint of the width of the planar wall portions.

18. The bird feeder of claim 17 wherein the handle extends in a plane and, when the feed holder is hung from an overhead object, the plane of the handle is orthogonal to the direction of the elongated slot.

19. The bird feeder of claim 18 wherein each concave detent has a circular end shape and each right angle end of the handle also has a circular shaped free end, and wherein the circular end shape of the detent matches the circular free end of the right angle end of the handle to enable tilting of the handle relative to the feed holder.

20. The bird feeder of claim 1 wherein the ends of the handle fit relatively tight in the handle slot so that the handle position can be maintained once set.

* * * * *